3,030,402
PRODUCTION OF HIGHER ALUMINUM ALKYLS
Isidor Kirshenbaum and Stanley B. Mirviss, Westfield, and Elroy J. Inchalik, Cranford, N.J., assignors to Esso Research and Engineering Company, a corporation of Delaware
No Drawing. Filed Apr. 27, 1959, Ser. No. 808,933
3 Claims. (Cl. 260—448)

This invention relates to the preparation of higher molecular weight aluminum alkyls by reacting aluminum alkyls, wherein at least one of the alkyl groups has a hydrocarbon substituent attached to the betacarbon atom, with ethylene. The aluminum alkyls so prepared can be used to make straight chain alcohols.

Low molecular weight aluminum trialkyls, e.g. aluminum triethyl, tripropyl, etc., can be reacted with ethylene under certain conditions to produce high molecular weight aluminum alkyls by growing the ethylene onto the alkyl radicals of the aluminum compound. In general, if aluminum triethyl is reacted with ethylene under growth conditions the ethylene will add on to the alkyl radicals effecting the production of aluminum alkyls wherein the alkyl radicals will contain from 4 to 16 and more carbon atoms per radical. It is to be understood that this product mixture is not a single aluminum trialkyl compound but a mixture of smear of aluminum trialkyls of varying molecular weights. Accordingly, under elevated temperatures and pressures ethylene may be grown onto aluminum triethyl to produce a mixture of compounds such as shown below:

$$Al(C_4H_9)_3$$
$$Al(C_6H_{13})_3$$
$$Al(C_8H_{17})_3$$
$$Al(C_{10}H_{21})_3$$
$$Al(C_{12}H_{25})_3$$
$$Al(C_{14}H_{29})_3$$
$$Al(\text{higher alkyls})_3$$

For the sake of simplicity the aluminum alkyls have been expressed as

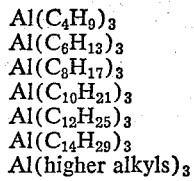

wherein the R's represent identical radicals; however it is to be understood that the aluminum compounds may contain mixed radicals as represented by the following formula:

Ethylene is the preferred olefin for this process since there is no tendency to form undesirable branchiness in the alkyl radicals of the aluminum compounds. It can be readily seen that when ethylene is grown on to aluminum trialkyl the alkyl radicals will increase in multiples of two.

The second step in preparing primary straight chain alcohols from aluminum trialkyls is the oxidation of the resultant mixture from the growth stage of the high molecular weight aluminum alkyls to the corresponding alcoholates. Oxidation may be accomplished by various means. However, the preferred method is by treatment with an oxidizing gas such as air. The reaction below is illustrative of the formation of the second stage alcoholates:

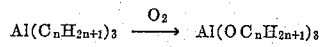

The third stage in this process is the hydrolysis of the alcoholate to produce the corresponding alcohols and alumina trihydrate which may be used to prepare catalytic and adsorbent alumina of the valuable eta variety; the hydrolysis proceeds in accordance with the following illustrative reaction:

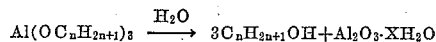

Hydrolysis may be carried out in the presence of steam at elevated temperatures but preferably a dilute aqueous solution of HCl is employed for this purpose.

The particular molecular weight of the alcohols obtained by this process is dependent upon the molecular weight of the alkyl radicals of the aluminum alkyls emanating from the growth stage. When employing aluminum triethyl, the aluminum alkyl smear or product mixture obtained contains a major portion of alkyl radicals having 10 carbon atoms per radical and less. This is to some extent undesirable since the more valuable and more difficultly obtainable primary straight chain alcohols are of the higher molecular weight variety, for example, $C_{12}$, $C_{14}$, $C_{16}$, etc. These alcohols are particularly useful in detergent preparation.

It is therefore a primary object of this invention to produce selectively a large amount, e.g. at least 40 mole percent, of high molecular weight alcohols by employing specific low molecular weight aluminum alkyls in the growth stage under certain temperatures and pressures.

This is a continuation-in-part of U.S. patent application Serial No. 578,902 of I. Kirshenbaum, S. B. Mirviss and E. J. Inchalik, filed April 18, 1956, and now abandoned.

The process of the present invention will be described more fully by a detailed reference to each of the individual stages:

GROWTH

In accordance with this invention, an aluminum alkyl wherein at least one of the alkyl radicals contains a hydrocarbon substituent attached to the beta carbon atom, i.e. the second carbon atom from the aluminum, is reacted with ethylene at temperatures of from 20–160° C., preferably 80–125° C., and pressures of 200–5000 p.s.i.g. The low molecular weight aluminum alkyls coming within the scope of this invention may be represented by the following formula:

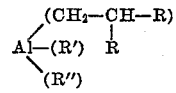

wherein R represents the same or different lower molecular weight alkyl radicals containing 1–4 carbon atoms. R′ and R″ each represent hydrogen or an isoalkyl such as

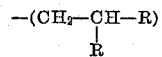

or normal alkyl radicals, e.g. ethyl, propyl, butyl and the like. Accordingly, the aluminum alkyl compounds which come within the scope of this invention will contain at least one alkyl radical having attached thereto on the beta carbon atom a hydrocarbon substituent and preferably a lower alkyl.

Examples of aluminum di- and tri-alkyls which may be employed are:

(A) 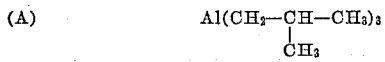

(B) 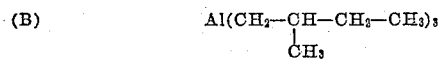

(C) 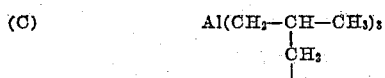

(D) 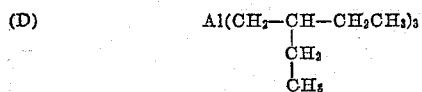

(E) 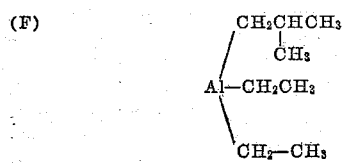

(F) 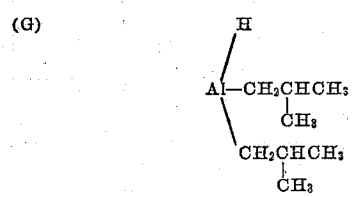

(G) 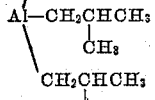

Instead of ethyl radicals in formulae E and F there can be propyl, butyl and the like radicals, and instead of the isobutyl radicals the aluminum compound can have attached thereto other beta substituted radicals such as those indicated above. The preferred aluminum alkyls are triisobutyl aluminum and diisobutyl aluminum monohydride.

This reaction, if applied to a continuous process, may be conducted in a conventional oxo type reactor or other type reactor having several sections packed with Raschig rings and the like to give good gas-liquid contacting. In any event, the ethylene is permitted to grow on to the aluminum alkyl for a period of 1 to 30 hours and preferably 2 to 10 hours. This time will depend on the rate of reaction which will depend on the pressure, reaction temperature and the particular aluminum alkyl used. The lower the pressures and temperatures, the slower the rate or longer the requisite time. Preferred temperatures and pressures are 80°–125° C. and 500–3000 p.s.i.g.; however, conditions such as 20°–160° C. and 200–5000 p.s.i.g. may be employed.

As previously noted, the use of an aluminum trialkyl or an aluminum dialkyl monohydride having a hydrocarbon substituent on the beta carbon atom of at least one of the alkyl groups permits the selective production of good yields of high molecular weight alcohols. Also the rate of total alcohol production is faster and the total alcohol yield greater than obtained with an aluminum alkyl which does not have branching at the beta carbon atom. While it is not intended to be bound by any theories, it is believed that a mole of ethylene first displaces one of the isoalkyl radicals and that the displaced isoalkyl radical, which then becomes the corresponding olefin and/or the dimer of the olefin, catalyzes, promotes or in some other manner upsets the normal product distribution and causes better growth of ethylene on to the aluminum alkyl to ultimately produce the higher molecular weight alkyl radicals. Under this theory each isoalkyl group is displaced with a mole of ethylene and thereafter additional moles of ethylene react to form a higher molecular weight alkyl radical so that in the case of an aluminum triisoalkyl more than 3 moles of ethylene will react with the aluminum compound. The reaction is illustrated below employing aluminum triisobutyl:

(1) 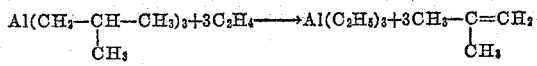

(2) 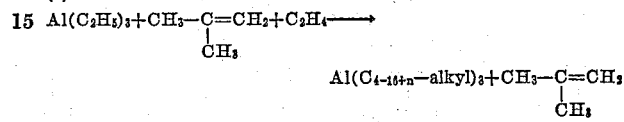

Surprisingly, if for example 1 mole of aluminum triisobutyl is first reacted with 3 moles of ethylene to prepare aluminum triethyl and isobutylene and the aluminum triethyl is then reacted with additional ethylene under the same conditions in the absence of the isobutylene and/or diisobutylene, the growth reaction then proceeds in a conventional manner yielding low percentages of the high molecular weight alkyl radicals.

OXIDATION

The product mixture from the growth stage comprising the higher molecular weight aluminum alkyls may then be oxidized to the corresponding aluminum alcoholate by any suitable process. In general, however, it is preferable to bubble oxygen or air or any oxygen containing gas through the product mixture at pressures of from about 0–500 p.s.i.g. and temperatures from 0°–90° C. or higher. In order to obtain a high degree of purity in the final alcohol product it is desirable to carry out the oxidation of the aluminum alkyls to the alcoholates as completely as possible, otherwise paraffins may be produced in the hydrolysis step which will cause separation problems due to azeotroping. To determine when oxidation ceases the effluent gases are measured for $O_2$ content. When the $O_2$ content of the effluent gas is the same as the gas entering the reactor, oxidation at that temperature is complete.

Although not necessary, if a hydrocarbon diluent or solvent is employed in the growth stage it is preferably removed at this point together with incidentally formed olefin by simply heating the product mixture to a bottoms temperature of about 200° C. to 240° C. under reduced pressure of from .1 to 5 mm. of Hg.

HYDROLYSIS

The hydrocarbon freed aluminum alcoholate mixture in accordance with the present invention is then hydrolyzed by first diluting the total alcoholate product with a liquid paraffin such as n-hexane, heptane, or an aromatic hydrocarbon such as benzene, toluene and the like to reduce viscosity. Although dilution is not absolutely necessary in most cases it is impractical to work with the aluminum alcoholate product mixture which is extremely viscous. In general, dilution with about an equal volume of the diluent is sufficient to make the aluminum alcoholate mixture of a good workable viscosity. The aluminum alcoholate mixture is then treated with an aqueous solution of HCl, $H_2SO_4$, $HNO_3$, NaOH, KOH, organic acids or bases and the like. Hydrolysis may also be accomplished if desired without extraneous ions such as with steam at elevated temperatures. The total hydrolyzed mixture is then preferably steam stripped of the alcohols and the alcohol containing distillate is permitted to stand whereupon two phases separate, a bottom aqueous phase and an alcohol-diluent layer. The alcohol-diluent phase may then be fractionated by any conventional means into the various alcohol components.

To further illustrate the invention a comparison was made between reactions employing aluminum triethyl and aluminum triisobutyl as the initial aluminum compound growth reagent and the results are shown in the following examples:

*Example 1*

Ethylene gas was pumped into a reactor bomb containing 45 grams of aluminum triisobutyl to a pressure of 1000 p.s.i.g. and the temperature was then raised to 100° C. and pressure and temperature maintained essentially constant for a period of three and one-half hours. The aluminum trialkyl product mixture was then oxidized by bubbling air through the mixture at a temperature of 80° C. and a pressure of 15 p.s.i. until oxidation was complete. The isobutyl groups were recovered primarily as diisobutylene at this point by heating the aluminum alcoholate product mixture to a bottoms temperature of about 200° C. This separation step is preferably employed to remove hydrocarbons boiling above the $C_8$ range since the higher molecular weight hydrocarbons will azeotrope with the alcohols and cause separation difficulties. The viscous aluminum alcoholate product mixture was then diluted with an equal volume of n-hexane and 250 volume percent of a dilute HCl solution (0.2 wt. percent) was added and the hydrolysis mixture stirred and refluxed. The total hydrolysis product was then steam stripped to remove the alcohols. The steam distillate separated into two phases, the top phase containing alcohols was separated. The aqueous layer was extracted with ether and the ether extract combined with the hexane-alcohol layer and the mixture dried with $Na_2SO_4$. The alcohols were first stripped to remove hexane and ether and then fractionated. The alcohols were found to have the following distribution.

| Primary straight chain alcohol: | Mole percent |
|---|---|
| $C_4$ | 14 |
| $C_6$ | 10 |
| $C_8$ | 8 |
| $C_{10}$ | 18 |
| $C_{12}$ | 18 |
| $C_{14+}$ | 32 |

The selectivity to alcohol was 92 mole percent with the incidental production of 8 mole percent hydrocarbon.

*Example 2*

The same experiment as described in Example 1 was carried out employing aluminum triethyl instead of aluminum triisobutyl wherein the growth reaction conditions were 100° C. and 900 p.s.i.g., for a period of seven hours (twice as long as in Example 1) with the following results:

| Primary straight chain alcohol: | Mole percent |
|---|---|
| $C_4$ | 6 |
| $C_6$ | 15 |
| $C_8$ | 27 |
| $C_{10}$ | 23 |
| $C_{12}$ | 6 |
| $C_{14+}$ | 23 |

In spite of the longer reaction time, considerably lower molecular weight alcohols were formed than with Al(i-Bu)$_3$. The selectivity was 94 mole percent alcohol and 6 mole percent hydrocarbon.

*Example 3*

Another comparative run, not within the scope of this invention, was carried out using aluminum triethyl instead of aluminum triisobutyl under the following growth conditions: 110° C. and 750 p.s.i.g. for five and one-half hours. The following is an analysis of the alcohol product.

| Primary straight chain alcohol: | Mole percent |
|---|---|
| $C_4$ | 3 |
| $C_6$ | 19 |
| $C_8$ | 30 |
| $C_{10}$ | 21 |
| $C_{12}$ | 7 |
| $C_{14+}$ | 20 |

The selectivity of this experiment was 89 mole percent to alcohols and 11 mole percent to hydrocarbon.

It will be noted that in Example 1, wherein conditions are within the scope of this invention, 50 mole percent of the total yield contained higher than $C_{10}$ alcohols whereas in the comparative runs using aluminum triethyl less than 30 mole percent of the total yield was higher than the $C_{10}$ alcohol.

*Example 4*

This example shows how aluminum dialkyl monohydrides may be used to prepare high molecular weight alcohols in accordance with the invention. A 30 weight percent solution of 71 grams of aluminum diisobutyl monohydried (0.50 mole) in 175 g. of dried n-heptane is treated in a 3 liter pressure container with ethylene at 1500 p.s.i.g. for 6 hours at 110° C. According to the weight gain after growth is completed, 9.5 moles of ethylene is absorbed for an average growth rate of 3.2 moles of ethylene/mole/hour. Similar results are obtained when the ethylene absorption is calculated on the basis of small pressure drops from slightly above to slightly below 1500 p.s.i.g.

The growth product is then oxidized by bubbling in air at 90° C. at atmspheric pressure. The air is predried before using. The completion of the oxidation is noted by an oxygen analyzer at the gas exit end of the oxidation equipment.

The heptane solution of the growth aluminum alcoholate is then hydrolyzed with a solution of ammonia in water (NH$_4$OH) at room temperature. The Al(OH)$_3$ precipitate is then filtered off and the n-heptane solution of even numbered primary straight chain alcohols is distilled. In addition to alcohols and n-heptane, isobutylene and diisobutylene are recovered. The product alcohols obtained have the following distribution of chain lengths by mole percent.

| Chain length of alcohol: | Mole percent |
|---|---|
| $C_4$ | 5 |
| $C_6$ | 12 |
| $C_8$ | 13 |
| $C_{10}$ | 15 |
| $C_{12}$ | 16 |
| $C_{14}$ | 14 |
| $C_{16}$ | 11 |
| $C_{18+}$ | 14 |

This distribution gives an average chain length of $C_{12.2}$ or an average growth rate of 3.0 moles of ethylene absorbed/mole aluminum/hour.

While the aforementioned process has been described in terms of a batchwise procedure, it will be readily apparent to the worker skilled in the art that such a process is easily adaptable to a continuous operation.

What is claimed is:

1. A method of preparing $C_{12}$ and higher aluminum alkyls which comprises reacting a low molecular weight aluminum alkyl, said aluminum alkyl containing at least one alkyl radical of the following formula:

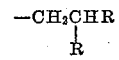

wherein each R represents a lower alkyl containing 1–4 carbon atoms, with a sufficient amount of ethylene at elevated temperatures and pressures to displace the alkyl radicals having the above formula and reacting the resulting ethyl aluminum compound with additional ethylene in the presence of the displaced alkyls under substantially the same conditions for a sufficient time to produce a mixture of higher molecular weight aluminum alkyls in which at least about 40 mole percent of the alkyl groups contain at least 12 carbon atoms.

2. A method according to claim 1 wherein said low molecular weight aluminum alkyl is aluminum triisobutyl.

3. A method according to claim 1 wherein said low molecular weight aluminum alkyl is aluminum diisobutyl monohydride.

References Cited in the file of this patent

UNITED STATES PATENTS

| | | |
|---|---|---|
| 2,699,457 | Ziegler et al. | Jan. 11, 1955 |
| 2,826,598 | Ziegler et al. | Mar. 11, 1958 |
| 2,835,689 | Ziegler et al. | May 20, 1958 |
| 2,892,858 | Ziegler | June 30, 1959 |

FOREIGN PATENTS

| | | |
|---|---|---|
| 540,135 | Belgium | Jan. 27, 1956 |

OTHER REFERENCES

Angewandte Chemie, Aug. 21, 1955, page 425.